United States Patent
Nishida

(10) Patent No.: US 10,372,314 B2
(45) Date of Patent: Aug. 6, 2019

(54) DISPLAY DEVICE AND DISPLAY CONTROL METHOD

(71) Applicant: KYOCERA Document Solutions Inc., Osaka (JP)

(72) Inventor: Atsushi Nishida, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 0 days.

(21) Appl. No.: 15/561,678

(22) PCT Filed: Mar. 30, 2016

(86) PCT No.: PCT/JP2016/060407
§ 371 (c)(1),
(2) Date: Sep. 26, 2017

(87) PCT Pub. No.: WO2016/185806
PCT Pub. Date: Nov. 24, 2016

(65) Prior Publication Data
US 2018/0081532 A1 Mar. 22, 2018

(30) Foreign Application Priority Data

May 19, 2015 (JP) .................................. 2015-101904

(51) Int. Cl.
*G06F 3/0485* (2013.01)
*G06F 3/0481* (2013.01)
*G06F 3/0488* (2013.01)

(52) U.S. Cl.
CPC ........ *G06F 3/04855* (2013.01); *G06F 3/0481* (2013.01); *G06F 3/0485* (2013.01); *G06F 3/04883* (2013.01)

(58) Field of Classification Search
CPC .. G06F 3/04855; G06F 3/0481; G06F 3/0485; G06F 3/04883
See application file for complete search history.

(56) References Cited

U.S. PATENT DOCUMENTS 6,570,594 B1 *  5/2003  Wagner ................. G06F 3/0481
                                                  715/781
2004/0216056 A1 * 10/2004  Tootill ................ G06F 3/04855
                                                  715/786

(Continued)

FOREIGN PATENT DOCUMENTS

| JP | 2002-244641 A | 8/2002 |
| JP | 2014-203202 A | 10/2014 |
| WO | 2014133030 A1 | 9/2014 |

OTHER PUBLICATIONS

International Business Machines Corporation: "On-demand and easily accessible scroll bars", Research Disclosure, Kenneth Mason Publications, Hampshire, UK, GB, vol. 437, No. 127, Sep. 1, 2000, XP007126865, ISSN: 0374-4353.

(Continued)

*Primary Examiner* — Andrea N Long
(74) *Attorney, Agent, or Firm* — IP Business Solutions, LLC

(57) ABSTRACT

A display device includes an object detecting section, a display section, a gesture acceptance section, and a display control section. The object detecting section detects an object contained in display target data. The display control section determines whether the object detected by the object detecting section is present in, of the display target data, a range of data displayed as a display screen image on the display section, keeps the display section from displaying a scroll bar in presence of the object in the range of data, and allows the display section to display the scroll bar in absence of the object in the range of data.

6 Claims, 9 Drawing Sheets

(56) References Cited

U.S. PATENT DOCUMENTS

| | | | |
|---|---|---|---|
| 2012/0290967 A1* | 11/2012 | Scott | G06F 17/30967 |
| | | | 715/780 |
| 2012/0304111 A1* | 11/2012 | Queru | G06F 3/0488 |
| | | | 715/784 |
| 2013/0067396 A1* | 3/2013 | Demopoulos | G06F 3/04855 |
| | | | 715/786 |
| 2013/0314446 A1* | 11/2013 | Maekawa | G06F 3/041 |
| | | | 345/684 |
| 2014/0173532 A1 | 6/2014 | Ikeda et al. | |
| 2016/0004420 A1 | 1/2016 | Noda | |

OTHER PUBLICATIONS

Extended European Search Report dated Nov. 28, 2018 mailed in the corresponding European Patent Application No. 16796200.0.

* cited by examiner

DISPLAY DEVICE AND DISPLAY CONTROL METHOD

TECHNICAL FIELD

The present invention relates to display devices and display control methods and particularly relates to a technique for providing a scrolling display of display target data.

BACKGROUND ART

Image forming apparatuses, mobile terminals, such as a smartphone, personal computers, and the like each include a display section, such as a liquid crystal display (LCD) or an organic EL (OLED: organic light-emitting diode), and allow the display section to display target data.

Because the display section has limited size, it may not be able to display a whole range of the display target data at a time. In this case, a partial range of the display target data is displayed and, upon acceptance of a user's scroll gesture, a display screen image is displayed by scrolling (see, for example, Patent Literature 1).

Furthermore, in the case of displaying a partial range of the display target data, a scroll bar is displayed on a portion of the display screen image (see, for example, Patent Literature 2). By checking for the scroll bar, a user can know whether or not the display screen image is displayed by scrolling.

CITATION LIST

Patent Literature

Patent Literature 1: JP-A-2014-203202
Patent Literature 2: JP-A-2002-244641

SUMMARY OF INVENTION

Technical Problem

When the scroll bar is displayed, a display area for displaying the display target data is narrowed by as much as the scroll bar is displayed. It is conceivable to always keep the scroll bar from being displayed in order to avoid the narrowing of the display area, but, in this case, the user may not be able to know whether or not the display screen image is displayed by scrolling.

The present invention has been made in view of the above circumstances and has an object of enabling a user to know whether or not a display screen image is displayed by scrolling while ensuring a display area for displaying display target data as widely as possible.

Solution to Problem

A display device according to an aspect of the present invention includes an object detecting section, a display section, a gesture acceptance section, and a display control section. The object detecting section detects an object contained in display target data. The display section displays a display screen image based on the display target data. The gesture acceptance section accepts a scroll gesture on the display screen image. The display control section is a display control section that allows, based on the scroll gesture accepted by the gesture acceptance section, the display section to provide a scrolling display, wherein the display control section determines whether the object detected by the object detecting section is present in, of the display target data, a range of data displayed as the display screen image on the display section, keeps the display section from displaying a scroll bar in presence of the object in the range of data, and allows the display section to display the scroll bar in absence of the object in the range of data.

Furthermore, a display control method according to another aspect of the present invention includes an object detecting step, a gesture acceptance step, and a display control step. In the object detecting step, an object contained in display target data to be displayed on a display section is detected. In the gesture acceptance step, a scroll gesture on a display screen image displayed on the display section based on the display target data is accepted. The display control step is a display control step of allowing, based on the scroll gesture accepted in the gesture acceptance step, the display section to provide a scrolling display, wherein it is determined whether the object detected in the object detecting step is present in, of the display target data, a range of data displayed as the display screen image on the display section, the display section is kept from displaying a scroll bar in presence of the object in the range of data, and the display section is allowed to display the scroll bar in absence of the object in the range of data.

Advantageous Effects of Invention

The present invention enables a user to know whether or not a display screen image is displayed by scrolling while ensuring a display area for displaying display target data as widely as possible.

DESCRIPTION OF EMBODIMENTS

Figure 1:
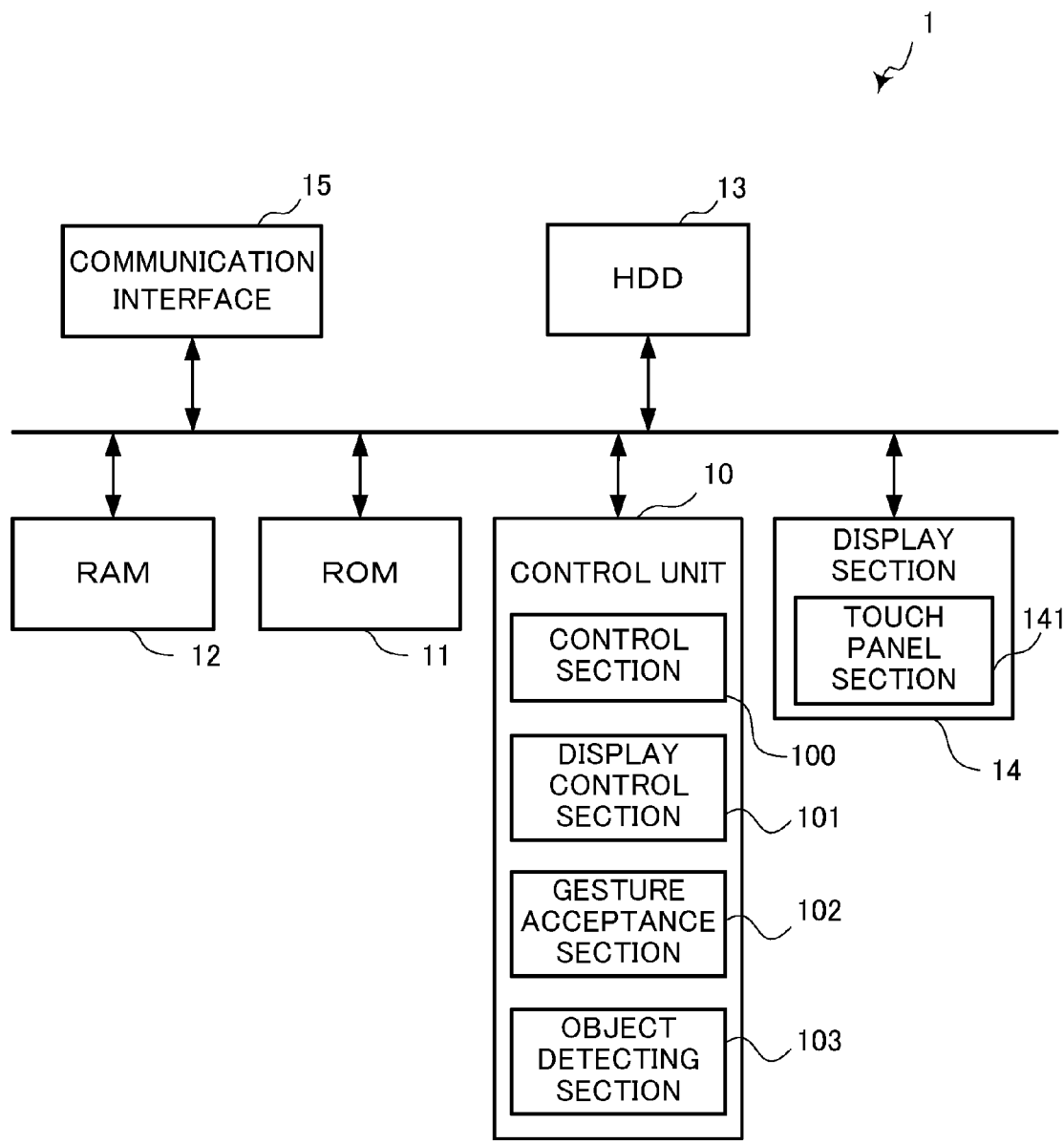
FIG. 1 is a block diagram showing an outline of an internal configuration of a display device according to one embodiment of the present invention.

Hereinafter, a description will be given of a display device, a display control program, and a display control method, all according to one embodiment of the present invention, with reference to the drawings. FIG. 1 is a block diagram showing an outline of an internal configuration of the display device according to the one embodiment of the present invention.

The display device 1 according to the one embodiment of the present invention is, for example, a mobile terminal, such as a smartphone, and includes a control unit 10, a ROM (read only memory) 11, a RAM (random access memory) 12, an HDD (hard disk drive) 13, a display section 14, and a communication interface 15. These components can transfer data or signals to and from one another via a CPU bus.

The HDD 13 is a large storage device and stores, in a portion of its storage area, data (display target data) to be displayed by the display section 14.

The communication interface 15 serves as an interface for data communication with personal computers and so on connected over a network.

The display section 14 is formed of a liquid crystal display, an organic EL or the like and displays display target data stored in the HDD 13 or display target data received through the communication interface 15 from an external personal computer or the like.

Furthermore, the display section 14 is provided with a touch panel section 141. The touch panel section 141 detects a user's touch on the display section 14, together with a point of touch (coordinate point). When detecting the user's touch, the touch panel section 141 outputs a detection signal indicating the point of touch to an after-mentioned display control section 101, an after-mentioned gesture acceptance section 102, and so on of the control unit 10. In this manner, the touch panel section 141 serves as a gesture input section through which user's gestures are input from the user.

The touch panel section 141 encompasses a touch panel operable to detect a user's finger or the like when the user's finger or the like, even if not touching the display section 14, comes within a certain distance of the display section 14. Therefore, the term "touch" used in this embodiment includes a state where a finger or the like coming within the certain distance of the display section 14 is detected, without an actual touch on the display section 14, by the function of the touch panel section 141, with the consideration of this state as a substantial touch.

Furthermore, the display device 1 may include physical keys in addition to or in place of the above touch panel section 141. Examples of the physical keys include arrow keys, a Page Up key, and a Page Down key.

The control unit 10 is formed of a CPU (central processing unit) or the like and governs the overall operation of the display device 1. The ROM 11 stores a display control program for controlling operations of the display device 1. The RAM 12 is used as an operating region of the control unit 10 and for other purposes.

The control unit 10 operates in accordance with the display control program stored in the ROM 11, the HDD 13 or the like to function as a control section 100, a display control section 101, a gesture acceptance section 102, and an object detecting section 103. Alternatively, each of the control section 100, the display control section 101, the gesture acceptance section 102, and the object detecting section 103 of the control unit 10 may not be implemented by the operation in accordance with the display control program but may be constituted by a hardware circuit.

The control section 100 governs the overall operation control of the display device 1. For example, the control section 100 uses the communication interface 15 to perform data communication with personal computers and so on connected over a network.

The gesture acceptance section 102 identifies a user's gesture input by a user, based on a detection signal output from the touch panel section 141. Then, the gesture acceptance section 102 accepts the identified user's gesture and outputs a control signal corresponding to the user's gesture to the control section 100, the display control section 101, and so on.

In this relation, user's gestures include a scroll gesture (referred to also as a swipe gesture), a select gesture (referred to also as a tap gesture), and a pinch gesture. For example, when the user slides his/her finger on the display section 14 while keeping it in touch with the display section 14, the touch panel section 141 outputs to the gesture acceptance section 102 detection signals indicating a series of points of movement from an initial point at which the touch has been first detected to a latest position at which the touch is last detected. The gesture acceptance section 102 identifies, based on the detection signals output from the touch panel section 141, a user's gesture input by the user as a scroll gesture. Then, the gesture acceptance section 102 outputs a control signal corresponding to the scroll gesture to the control section 100, the display control section 101, and so on.

The display control section 101 has a function to control the display operation of the display section 14 based on a user's gesture accepted by the gesture acceptance section 102. For example, when the gesture acceptance section 102 accepts a scroll gesture, the display control section 101 allows a display screen image displayed on the display section 14 to be displayed by scrolling according to the scroll gesture.

Figure 2:
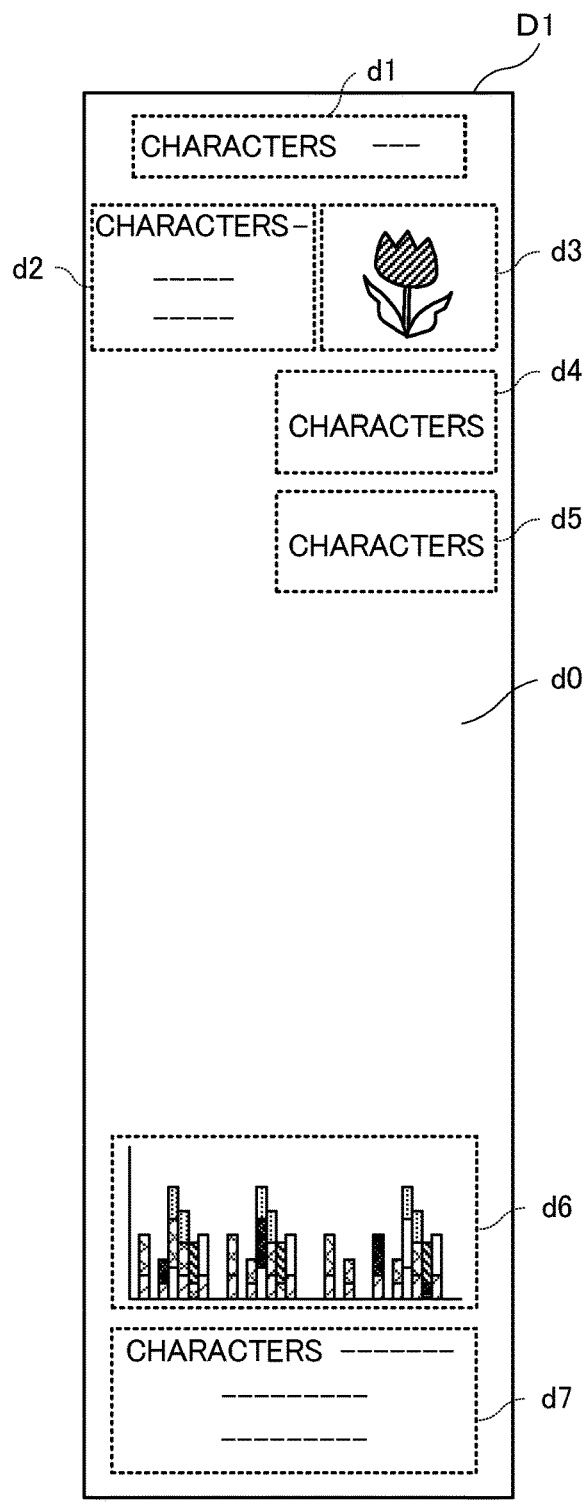
FIG. 2 is a view showing an example of display target data.

FIG. 2 is a view showing an example of display target data. Display target data D1 is composed of a background image portion d0 and object portions d1 to d7. The background image portion d0 is formed of monochromatic image data. The object portions d1 to d7 are each formed of a minimum rectangle containing an object, such as a batch of characters or graphics, located in a unitary area. In an example shown in FIG. 2, the object portions d1, d2, d4, d5, and d7 each contain a batch of characters and object portions d3 and d6 each contain a batch of graphics.

Figure 3:
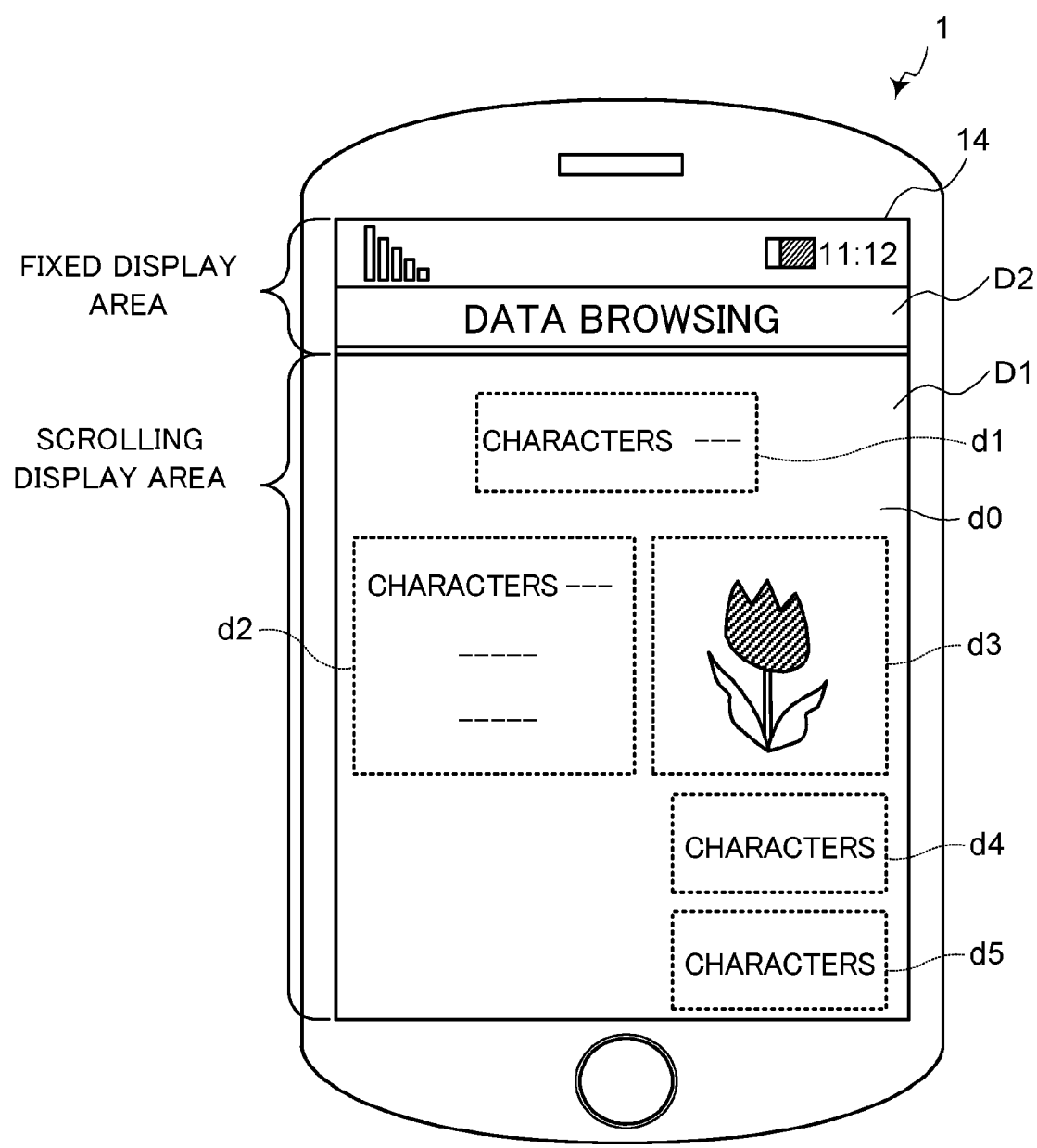
FIG. 3 is a view showing an example of a display screen image displayed on a display section of the display device according to the one embodiment of the present invention.

FIG. 3 is a view showing a display screen image displayed on the display section 14. As shown in FIG. 3, a display area of the display section 14 where data can be displayed includes a fixed display area and a scrolling display area. Display target data D1 to be displayed by scrolling according to a scroll gesture is displayed in the scrolling display area, while predefined data D2 is displayed in the fixed display area.

Because the display section 14 has limited size, it cannot display a whole range of the display target data D1 within the scrolling display area at a time. Therefore, in the example shown in FIG. 3, the display control section 101 allows a partial range of the display target data D1 to be displayed as a display screen image in the scrolling display area. When the gesture acceptance section 102 accepts a user's scroll gesture, the display control section 101 provides a scrolling display of the display screen image displayed in the scrolling display area.

Furthermore, the display control section 101 determines whether or not any objects are present in, of the display target data D1, a range of data displayed on the display section 14. Then, the display control section 101 keeps the display section 14 from displaying a scroll bar when any objects are present, while the display control section 101 allows the display section 14 to display the scroll bar when no object is present. Details of the functions of the display control section 101 will be described hereinafter.

The object detecting section 103 has a function to detect any objects contained in the display target data D1. Specifically, the object detecting section 103 subjects the display target data D1 to rasterization to obtain bitmap data. Then, the object detecting section 103 analyzes the bitmap data to acquire information (object information) indicating the number and areas of objects contained in the display target data D1.

Figure 4:
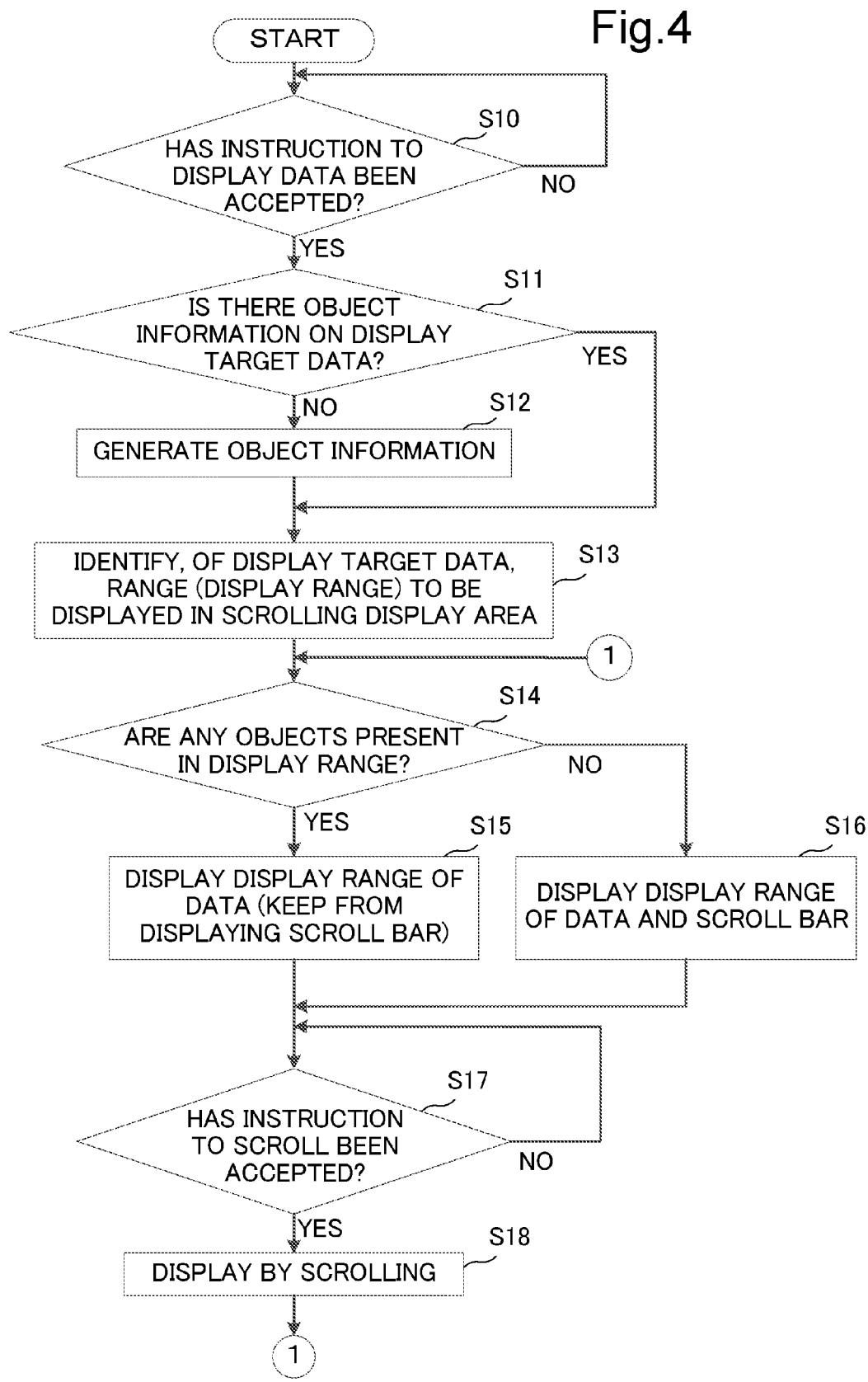
FIG. 4 is a flowchart showing a flow of a scrolling display operation of the display device according to the one embodiment of the present invention.

Next, a description will be given of an operation of the display device 1 having the above configuration. FIG. 4 is a flowchart showing a flow of a scrolling display operation of the display device 1.

When the gesture acceptance section 102 accepts an instruction to display target data D1 (YES in step S10), the object detecting section 103 determines whether or not there is object information indicating the number and areas of objects contained in the display target data D1 (step S11).

When there is no object information (NO in step S11), the object detecting section 103 analyzes the display target data D1 and generates object information (step S12). On the other hand, when object information is stored in the HDD 13 or sent from an external personal computer or the like, that is, when object information is present (YES in step S11), the object detecting section 103 does not perform the processing in step S12 and accesses the HDD 13 to acquire the object information. The object detecting section 103 may allow a storage section capable of fast readout, such as the RAM 12, to previously store object information being stored in the HDD 13 or object information sent from an external personal computer or the like. In this case, the object detecting section 103 accesses the RAM 12 or the like to acquire the object information.

The display control section 101 identifies, of the display target data D1, a range (display range) to be displayed in the scrolling display area (step S13).

Then, the display control section 101 determines, based on the object information acquired by the object detecting section 103, whether or not any objects are present in the display range identified in the processing in step S13 (step S14).

When any objects are present (YES in step S14), the display control section 101 allows the display section 14 to display the range of display target data D1 identified in step S13 (step S15). In doing so, the display control section 101 keeps the display section 14 from displaying a scroll bar.

On the other hand, when no object is present (NO in step S14), the display control section 101 allows the display section 14 to display the range of display target data D1 identified in step S13 and a scroll bar (step S16).

When, after the processing in step S15 or step S16, the gesture acceptance section 102 accepts a scroll gesture (YES in step S17), the display control section 101 allows the display section 14 to provide a scrolling display (step S18) and the process then goes back to the processing in step S14.

The above scrolling display operation will be described more specifically with reference to FIG. 3 and FIGS. 5 to 7.

In the example shown in FIG. 3, objects (the object portions d1, d2, d3, d4, and d5) are present in the display range of display target data D1 and, therefore, the display control section 101 keeps the display section 14 from displaying a scroll bar. When in a state shown in FIG. 3 the gesture acceptance section 102 accepts a scroll gesture, the display control section 101 allows the display section 14 to provide a scrolling display. Because no scroll bar is displayed in the display screen image but objects are present in the display range of display target data D1, the user can check whether the objects are changed in position owing to the scrolling display and, thus, the user can know whether or not the display screen image is displayed by scrolling.

Figure 5:
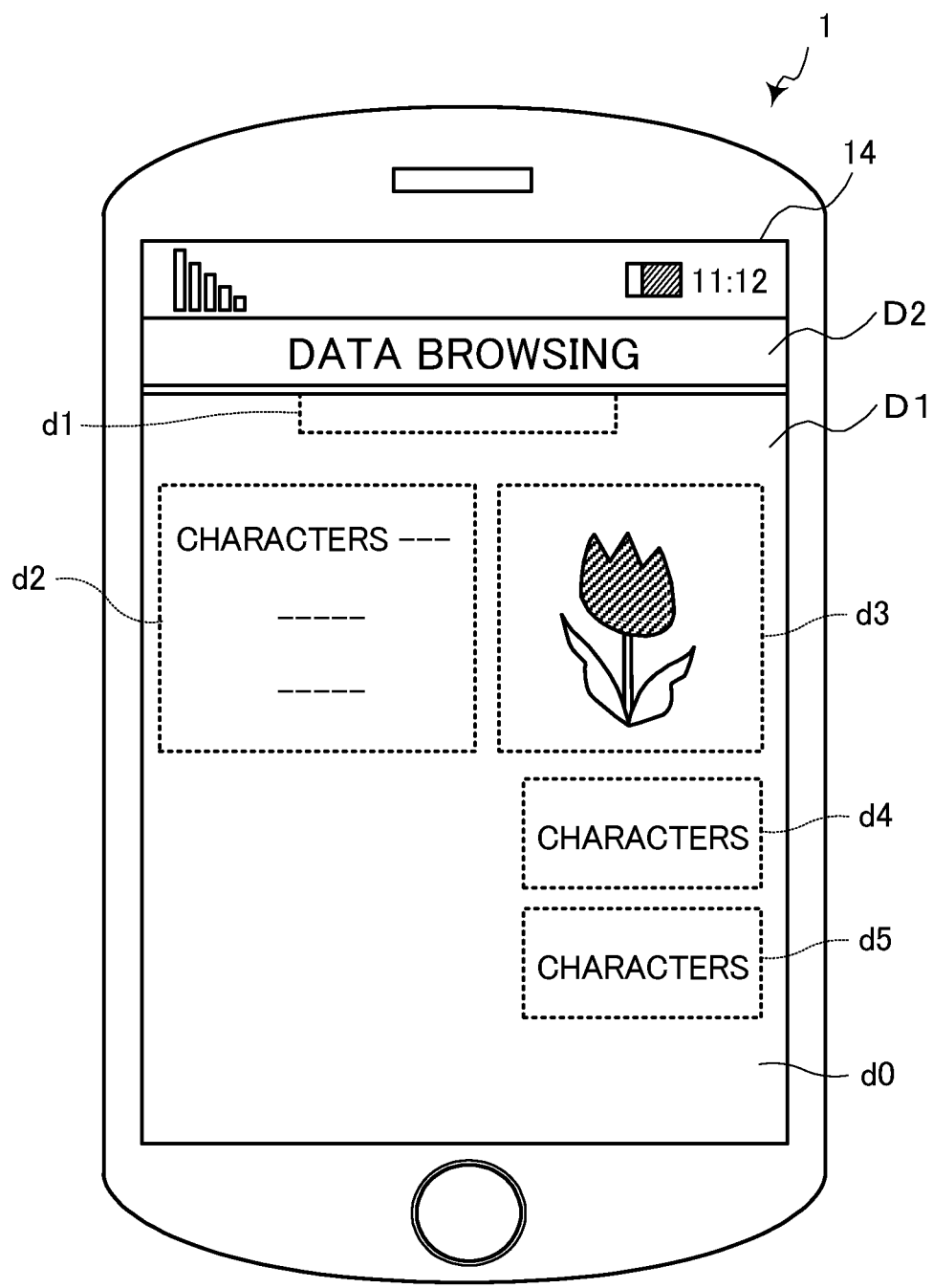
FIG. 5 is a view showing an example of a display screen image displayed on the display section of the display device according to the one embodiment of the present invention.

When the display screen image is displayed by scrolling from the state shown in FIG. 3, a display screen image is given as shown in FIG. 5. Also in the example shown in FIG. 5, objects are present in the display range of display target data D1 and, therefore, the display control section 101 keeps the display section 14 from displaying a scroll bar.

Figure 6:
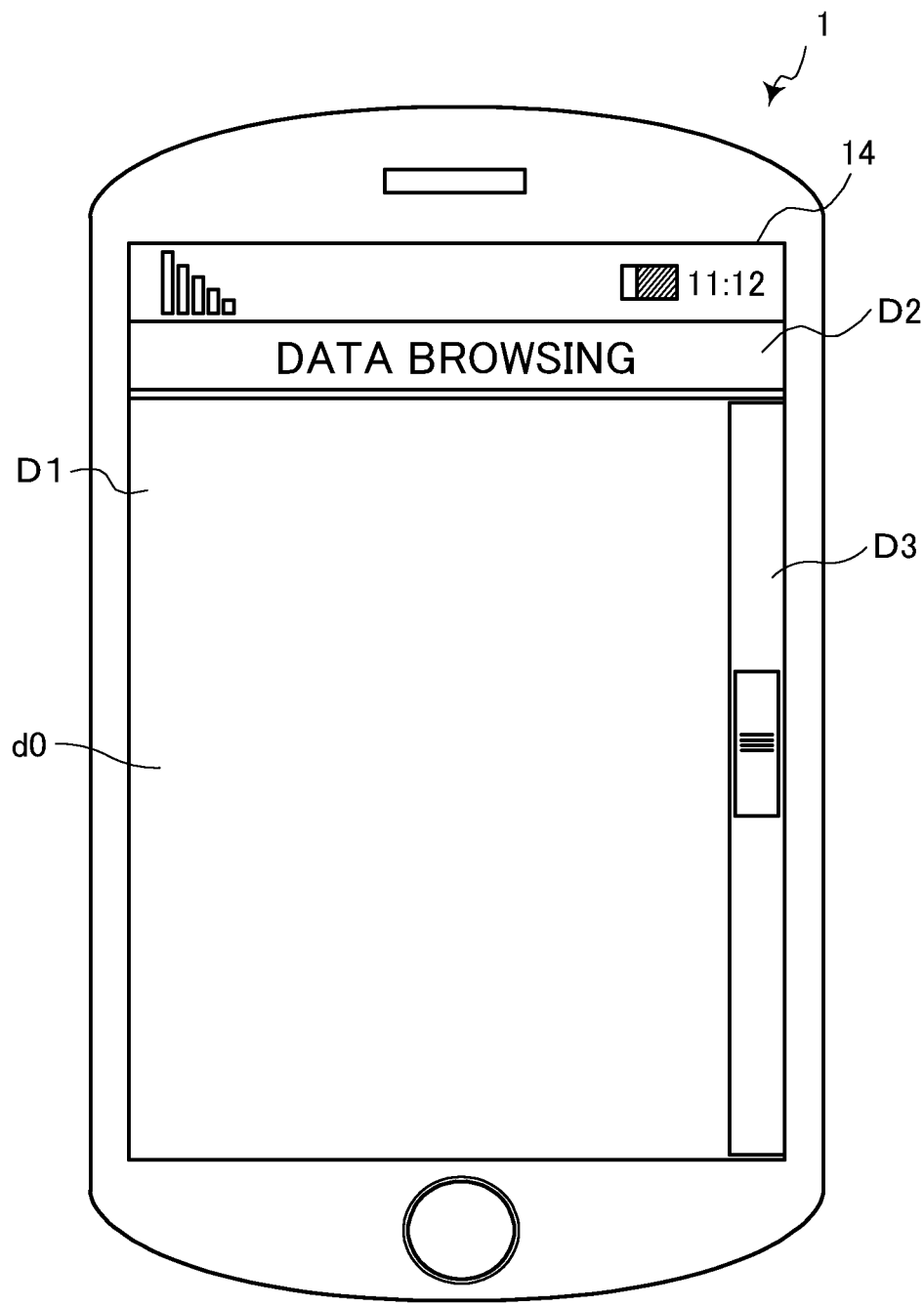
FIG. 6 is a view showing an example of a display screen image displayed on the display section of the display device according to the one embodiment of the present invention.

On the other hand, when the display screen image is further displayed by scrolling from the state shown in FIG. 5, a display screen image is given as shown in FIG. 6. In the example shown in FIG. 6, only a background image portion d0 is present and no object is present in the display range of display target data D1. Therefore, the display control section 101 allows the display section 14 to display a scroll bar D3. Because the background image portion d0 is formed only of monochromatic image data, the user cannot know, even if checking the display screen image, whether or not the display screen image is displayed by scrolling. However, since the scroll bar D3 is displayed on the display section 14, the user can know, by checking for the scroll bar D3, whether or not the display screen image is displayed by scrolling.

Figure 7:
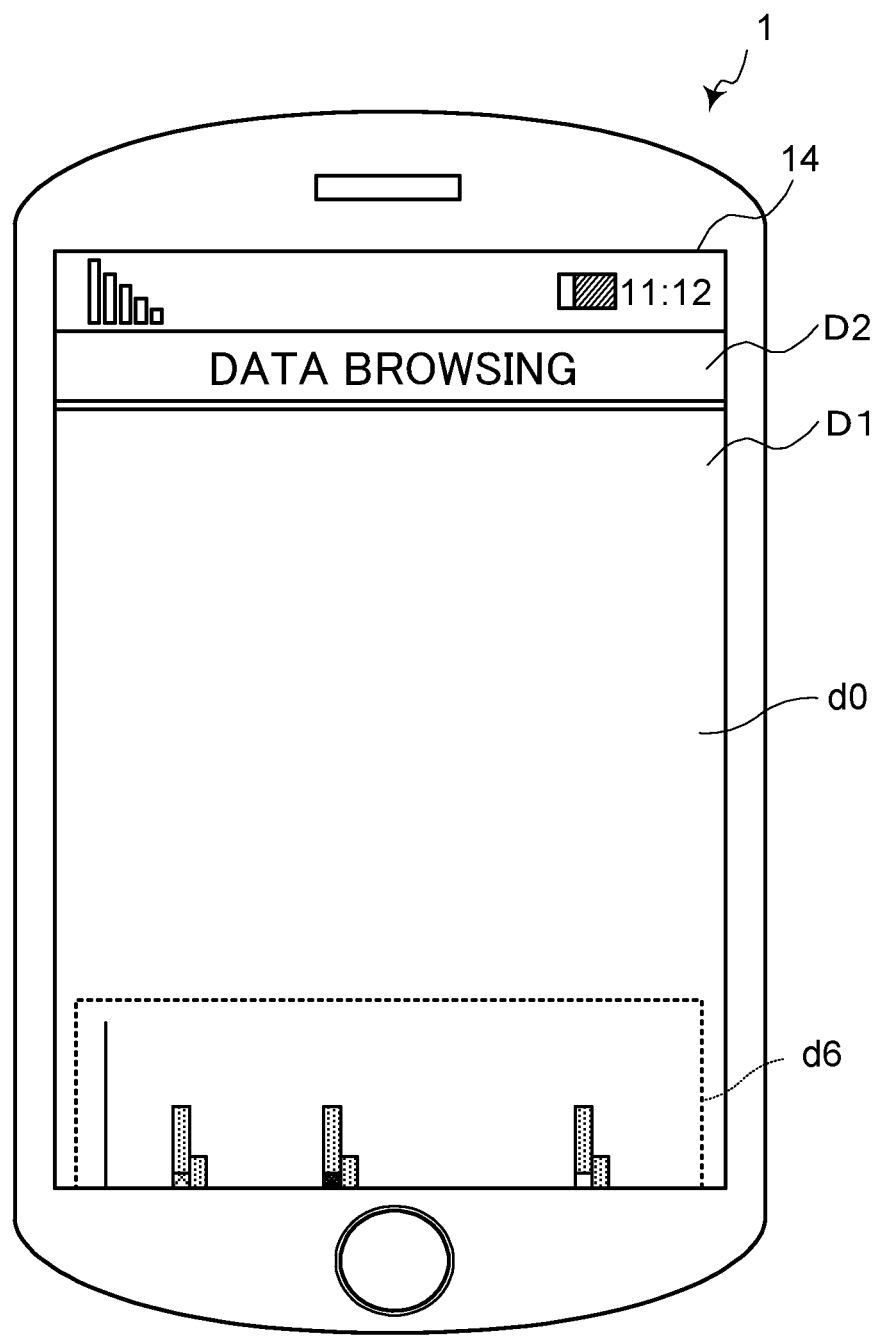
FIG. 7 is a view showing an example of a display screen image displayed on the display section of the display device according to the one embodiment of the present invention.

Furthermore, when the display screen image is further displayed by scrolling from the state shown in FIG. 6, a display screen image is given as shown in FIG. 7. In the example shown in FIG. 7, an object (the object portion d6) is present in the display range of display target data D1 and, therefore, the display control section 101 keeps the display section 14 from displaying a scroll bar.

Note that when keeping the display section 14 from displaying a scroll bar, the display control section 101 expands the display area of the display section 14 where the display target data D1 is displayed to a display area of the display section 14 where when allowing the display section 14 to display the scroll bar D3, the scroll bar D3 is displayed. Thus, a situation can be avoided that because of the display of the scroll bar D3, the display area for displaying the display target data D1 is narrowed by as much as the scroll bar D3 is displayed.

The present invention is not limited to the configuration of the above embodiment and can be modified in various ways. For example, although the above embodiment shows the display device 1 which is a mobile terminal, such as a smartphone, taken as an example of the display device according to the present invention, the present invention is not necessarily limited to this case. The present invention can be applied to, in addition to a mobile terminal, such as a smartphone, various types of equipment with a display section, such as, for example, a personal computer and an image forming apparatus.

Furthermore, although in the above embodiment the description has been given of the case where an image displayed on the display section 14 is displayed by scrolling by a swipe gesture using a touch panel function, the present invention is not necessarily limited to this case. The image displayed on the display section 14 may be displayed by scrolling by a swipe gesture without using a touch panel function. Examples of such a gesture include a scroll gesture using rotation of a wheel button provided in a mouse or the like and a scroll gesture using selection of a scroll bar.

Hereinafter, a description will be given of other modifications.

<Modification 1>

Figure 8:
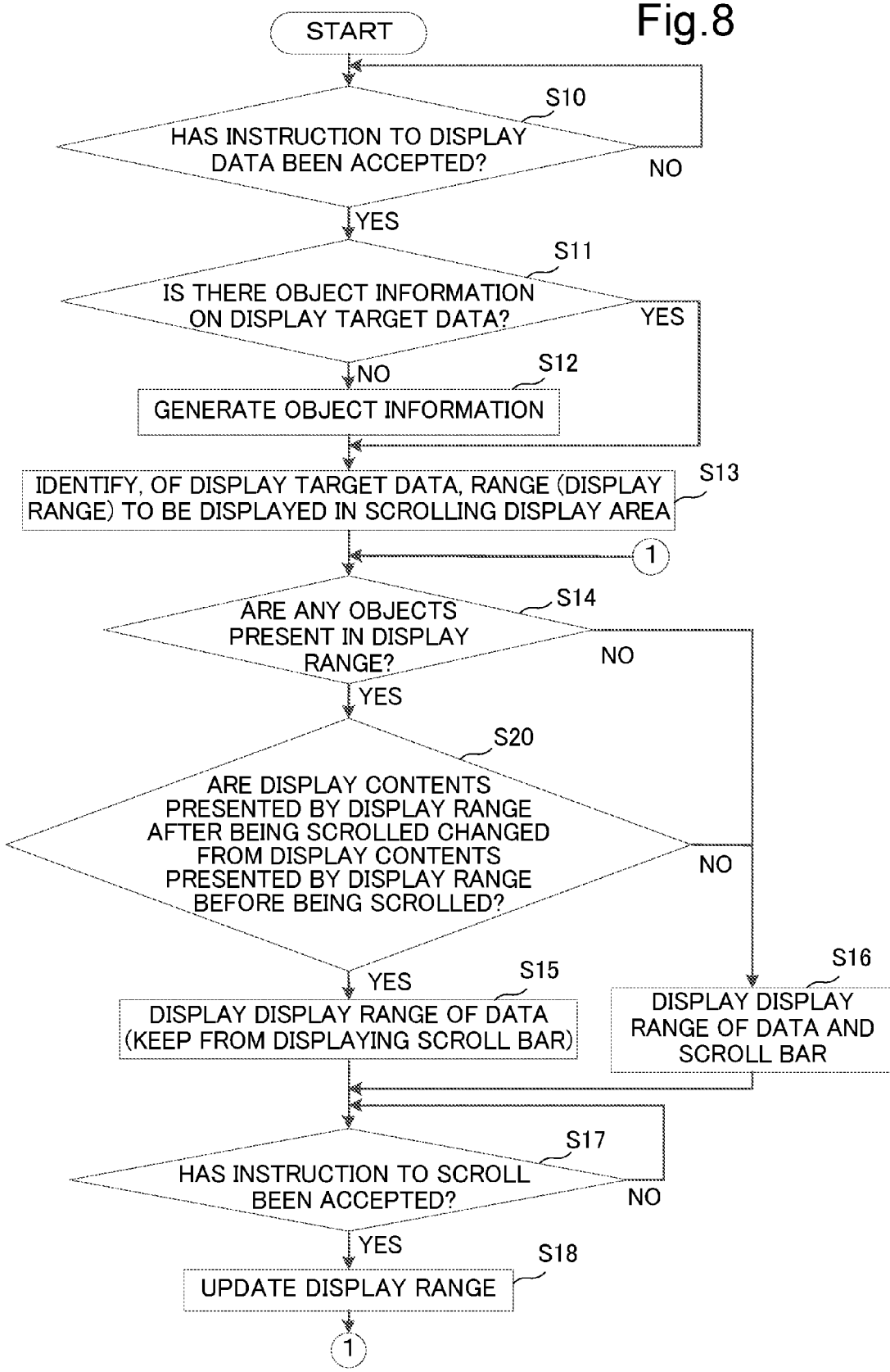
FIG. 8 is a flowchart showing a flow of a scrolling display operation of a display device according to Modification 1 of the present invention.

FIG. 8 is a flowchart showing a flow of a scrolling display operation of a display device according to Modification 1. The same steps of processing as those described with reference to the flowchart shown in FIG. 4 are designated by the same references and further explanation thereof will be omitted.

In the display device according to Modification 1, when an object is present in the display range identified in the processing in step S13 (YES in step S14), the display control section 101 determines whether or not display contents presented by the display range after being scrolled are changed from display contents presented by the display range before being scrolled (step S20). Specifically, when an object present in a range of display target data D1 displayed as a display screen image on the display section 14 is an object formed of the same object aligned in the scrolling direction, the display control section 101 determines that display contents presented by the display screen image after being scrolled remain unchanged from display contents presented by the display screen image before being scrolled.

Figure 9:
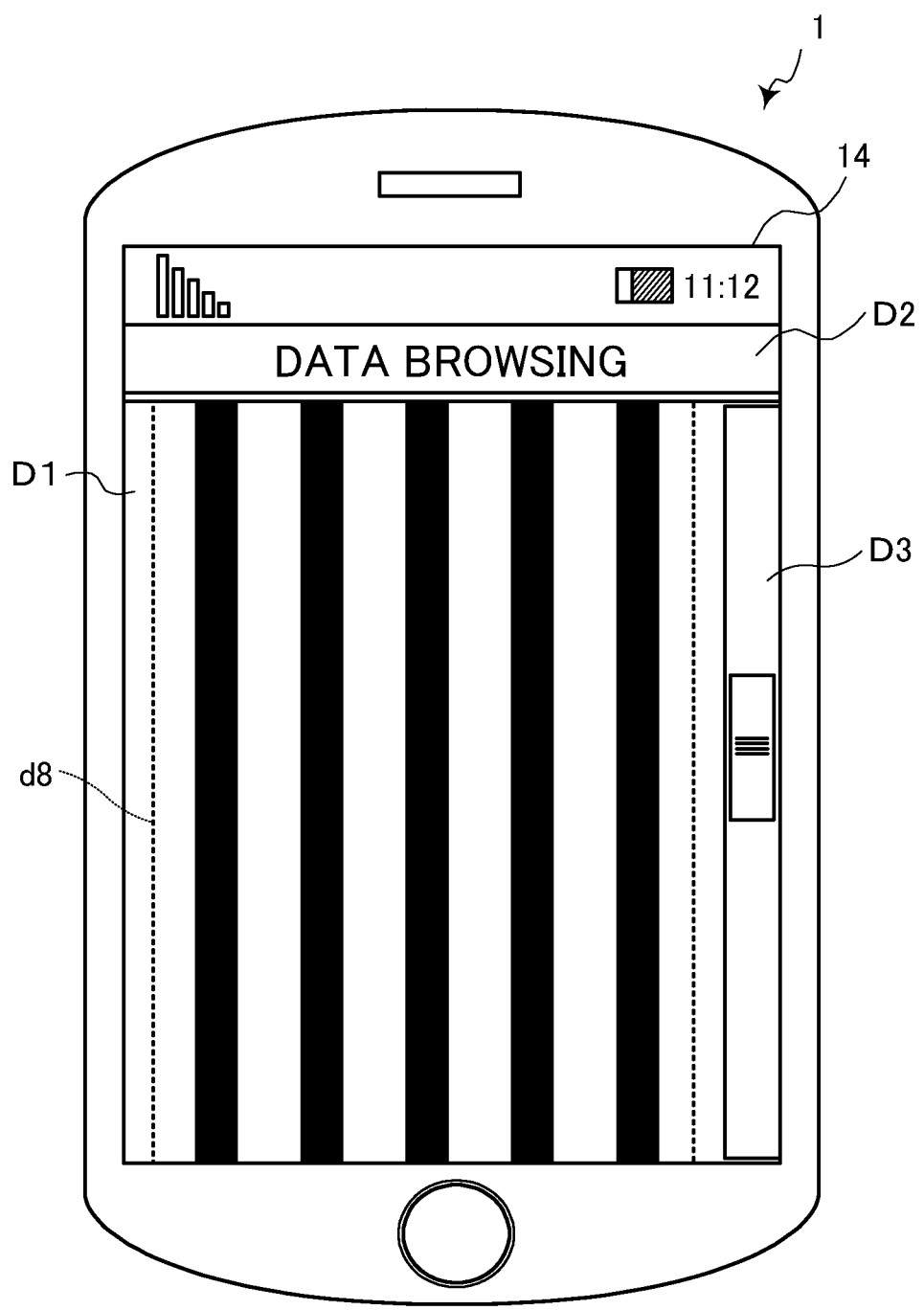
FIG. 9 is a view showing an example of a display screen image displayed on a display section of the display device according to Modification 1 of the present invention.

For example, when the display screen image displayed on the display section 14 is a display screen image shown in FIG. 9, an object portion d8 is present in the display range. The object portion d8 is an object formed of the same graphics (object) aligned in the scrolling direction and, therefore, its display contents remain unchanged even after the object portion d8 is displayed by scrolling. That is, the display contents presented by the display range after being scrolled remain unchanged from the display contents presented by the display range before being scrolled. In this case, the user cannot check whether the object is changed in position based on the scrolling display and, therefore, the user cannot know whether or not the display screen image is displayed by scrolling.

Hence, when the display contents presented by the display range after being scrolled remain unchanged from the display contents presented by the display range before being scrolled (NO in step S20), the display control section 101 allows the display section 14 to display the scroll bar D3 (step S16).

On the other hand, when the display contents presented by the display range after being scrolled are changed from the display contents presented by the display range before being scrolled (YES in step S20), the display control section 101 keeps the display section 14 from displaying the scroll bar D3 (step S15).

<Modification 2>

In a display device according to Modification 2, the object detecting section 103 not only detects any objects contained in the display target data D1 but additionally determines the attributes of the detected objects. Specifically, the object detecting section 103 determines whether each of the detected objects is a character object formed of a plurality of characters or a graphic object containing any graphics.

When an object is present in a range of data displayed on the display section 14 and the object is a character object, the display control section 101 allows the display section 14 to display a scroll bar. On the other hand, when an object is present in a range of data displayed on the display section 14 and the object is a graphic object, the display control section 101 keeps the display section 14 from displaying a scroll bar.

Furthermore, when a plurality of objects are present in a range of data displayed on the display section 14, the display control section 101 allows the display section 14 to display a scroll bar if all of the plurality of objects are character objects. On the other hand, when the plurality of objects contain at least one graphic object, the display control section 101 keeps the display section 14 from displaying a scroll bar.

When an object contained in the display range is a character object, there may be cases where a change of the character object is difficult to notice even if the display screen image is displayed by scrolling. The display device according to Modification 2 can avoid a situation that the user overlooks the scrolling display because he/she is unaware of a change of the character object.

What is claimed is:

1. A display device comprising:
   a display section that displays a display screen image based on the display target data; and
   a control unit that includes a CPU, wherein
   upon execution of a display control program by the CPU, the control unit functions as:
      an object detecting section that detects an object, the object being an image formed of graphics or characters and composing a part of the display target data;
      a gesture acceptance section that accepts a scroll gesture on the display screen image; and
      a display control section that allows, based on the scroll gesture accepted by the gesture acceptance section, the display section to provide a scrolling display, wherein while allowing the display section to provide the scrolling display, the display control section determines whether the object detected by the object detecting section is present in, of the display target data, a range of data displayed as the display screen image on the display section, keeps the display section from displaying a scroll bar in presence of the object in the range of data, and allows the display section to display the scroll bar in absence of the object in the range of data.

2. The display device according to claim 1, wherein when keeping the display section from displaying the scroll bar, the display control section expands a display area of the display section where the display screen image is displayed to a display area of the display section where when allowing the display section to display the scroll bar, the scroll bar is displayed.

3. The display device according to claim 1, wherein while allowing the display section to provide the scrolling display, even when the object is present in the range of data displayed as the display screen image on the display section, the display control section determines whether, when the display screen image is scrolled, display contents presented by an entire of the display screen image that is to be displayed immediately after the display screen image following this display screen image are changed from display contents presented by the entire of the display screen image before being scrolled, and the display control section allows the display section to display the scroll bar when determining that the display contents remain completely unchanged.

4. The display device according to claim 3, wherein when the object present in the range of data displayed as the display screen image on the display section is an object formed of the same object aligned in a scrolling direction, the display control section determines that the display contents presented by the display screen image after being scrolled remain unchanged from the display contents presented by the display screen image before being scrolled.

5. The display device according to claim 1, wherein when the object is present in the range of data displayed on the display section and the object is a graphic object, the display control section keeps the display section from displaying the scroll bar, while when the object is present in the range of data displayed on the display section and the object is a character object, the display control section allows the display section to display the scroll bar.

6. A display control method comprising:
- an object detecting step of detecting an object, the object being an image formed of graphics or characters and composing a part of the display target data;
- a gesture acceptance step of accepting a scroll gesture on a display screen image displayed on a display section based on the display target data; and
- a display control step of allowing, based on the scroll gesture accepted in the gesture acceptance step, the display section to provide a scrolling display, wherein while allowing the display section to provide the scrolling display, whether the object detected in the object detecting step is present in, of the display target data, a range of data displayed as the display screen image on the display section is determined, the display section is kept from displaying a scroll bar in presence of the object in the range of data, and the display section is allowed to display the scroll bar in absence of the object in the range of data.

* * * * *